United States Patent
Cho et al.

(10) Patent No.: US 8,681,425 B2
(45) Date of Patent: Mar. 25, 2014

(54) OPTICAL SHEET HAVING AT LEAST, A PATTERN LAYER AND A CORE LAYER COMPOSED OF LIGHT-PERMEABLE THERMOPLASTIC RESINS, AND MANUFACTURING METHOD THEREOF

(75) Inventors: TaeHwi Cho, Jungde (KR); SoonHun Jung, Gimhae (KR); YoungSub Jung, Gimhae (KR); JongMin Jung, Kyungnam (KR)

(73) Assignee: Bayer MaterialScience AG, Leverkusen (DE)

( * ) Notice: Subject to any disclaimer, the term of this patent is extended or adjusted under 35 U.S.C. 154(b) by 322 days.

(21) Appl. No.: 13/061,599

(22) PCT Filed: Aug. 27, 2009

(86) PCT No.: PCT/EP2009/006201
§ 371 (c)(1),
(2), (4) Date: Mar. 1, 2011

(87) PCT Pub. No.: WO2010/022937
PCT Pub. Date: Mar. 4, 2010

(65) Prior Publication Data
US 2011/0157690 A1    Jun. 30, 2011

(30) Foreign Application Priority Data
Sep. 1, 2008 (KR) .......... 10-2008-0085960

(51) Int. Cl.
*G02B 5/02* (2006.01)

(52) U.S. Cl.
USPC .......................................... 359/599

(58) Field of Classification Search
USPC .......................................... 359/599
See application file for complete search history.

(56) References Cited

U.S. PATENT DOCUMENTS

| | | | |
|---|---|---|---|
| 4,707,393 A | 11/1987 | Vetter | |
| 5,846,659 A | 12/1998 | Lower et al. | |
| 5,995,288 A * | 11/1999 | Kashima et al. | 359/599 |
| 7,327,415 B2 * | 2/2008 | Brickey et al. | 349/64 |
| 7,851,054 B2 * | 12/2010 | Weber et al. | 428/220 |
| 2006/0262666 A1 | 11/2006 | Paek et al. | |
| 2008/0020186 A1 | 1/2008 | Hebrink et al. | |
| 2008/0152886 A1 | 6/2008 | Salewski et al. | |
| 2008/0224339 A1 | 9/2008 | Schmidt et al. | |

FOREIGN PATENT DOCUMENTS

| | | |
|---|---|---|
| DE | 102005060731 | 6/2007 |
| EP | 0110221 | 6/1984 |
| EP | 0110238 | 6/1984 |
| EP | 0716919 | 6/1996 |
| EP | 1916086 | 4/2008 |

* cited by examiner

*Primary Examiner* — Stephone B Allen
*Assistant Examiner* — Tamara Y Washington
(74) *Attorney, Agent, or Firm* — Novak Druce Connolly Bove + Quigg LLP

(57) ABSTRACT

An optical sheet and a method of manufacturing the same, and more specifically an optical sheet to use for back light units of Liquid Crystal Devices (LCD's), lighting devices of billboards and the like, and a method of manufacturing the same, is disclosed.

12 Claims, 6 Drawing Sheets

US 8,681,425 B2

OPTICAL SHEET HAVING AT LEAST, A PATTERN LAYER AND A CORE LAYER COMPOSED OF LIGHT-PERMEABLE THERMOPLASTIC RESINS, AND MANUFACTURING METHOD THEREOF

PRIORITY

Priority is claimed as a national stage application, under 35U.S.C. §371, to PCT/EP2009/006201, filed Aug. 27, 2009, which claims priority to Republic of Korea application 1020080085960, filed Sep. 1, 2008. The disclosures of the aforementioned priority applications are incorporated herein by reference in their entirety.

The present invention relates to an optical sheet and a method of manufacturing the same, and more specifically to an optical sheet to use for back light units of Liquid Crystal Devices (LCD's), lighting devices of billboards and the like, and a method of manufacturing the same.

In general, an optical sheet is used to form a surface light source by diffusing light coming from a lamp. Such an optical sheet is formed from compositions obtained by mixing transparent resins and light-scattering agents or by forming the diffusion or light guiding pattern comprised of micro-patterns, such as lenticular lens, Fresnel lens, prism, semicircle lens, semi-oval lens, etc., on the surface of resin boards.

Optical films, such as prism films and diffuser films, are used along with said optical sheets and are available as various products manufactured in various methods owing to technological development. On the other hand, optical sheets are currently manufactured primarily by mixing light scattering agents and other additives with a transparent resin, which is in favor of the previously described manufacturing methods.

The reason for this is the difficulty to reproduce micro-patterns on the surface of an optical sheet which is thicker than that of an optical film, in a manufacturing process. Furthermore, the volume and the weight of the product make it hard to handle, resulting in poor mass-productivity and increased cost, even when an optical sheet pattern is manufactured through a secondary process, such as coating, surface processing and the like. This, in turn, causes difficulties in commercialization.

Thus, there is a desperate need for an optical sheet with various functions and superior optical characteristics, which can be manufactured highly efficiently at minimum costs and efforts, without the problems described above.

Still, the conventional optical sheet, wherein a transparent resin and a light-scattering agent are mixed together, and a method of manufacturing the same are not enough to satisfy the previously mentioned demands since the only solution to the problem is to change the quality or the size of a light-scattering agent. Therefore, the present invention provides a solution to the problem pertaining to the formation of micro-patterns on a transparent resin, and thereby resolves the problems of declining mass-productivity and productivity.

The object of the present invention is to provide an optical sheet having an enhanced transcription rate of the diffusion or light guiding pattern that diffuses light.

Another object of the present invention is to provide a manufacturing method which provides excellent productivity and enables manufacturing an optical sheet at low cost.

The objects of the present invention mentioned above can be achieved by an optical sheet, wherein said optical sheet is composed of a light permeable resin which permits the light to pass through and comprises a pattern layer and a core layer, wherein the diffusion or light guiding pattern diffusing light is formed on one surface of said pattern layer, and said core layer, having a higher viscosity than said pattern layer, is formed on the other side of said pattern layer.

In another aspect, the method of manufacturing an optical sheet according to the present invention comprising:

a) a co-extrusion process wherein the first raw materials are extruded by a main extruder, and the second raw materials having a lower viscosity than said first raw materials are extruded by a co-extruder; said co-extrusion process continuously transports, pressurizes and melts the first and second raw materials in the main extruder and the co-extruder, respectively, by the difference in the relative velocity between a rotating screw and a barrel;

b) a sheet forming process that forms the first and second raw materials, that are completely melted through the co-extrusion process, into a sheet comprising a pattern layer and a core layer through a T-die;

c) a calendering process that forms the diffusion or light guiding pattern, which diffuses lights, on the pattern layer by pressing said optical sheet using a calender roll, whose surface has a lower temperature than the glass transition of the first and second raw materials and where the pressing part is formed around the roll; and d) a cooling process wherein said optical sheet with the diffusion or light guiding pattern formed on the pattern layer is cooled evenly by use of a guide roll, whereas the smoothness is maintained.

The compositions of the pattern layer and the core layer with different viscosities enhance the transcription rate of the diffusion or light guiding pattern to diffuse light. Thereby, the formation of various micro-patterns on the surface of the pattern layer is facilitated.

The pattern layer and the core layer may be produced by the same kind of resin, which has the effect of eliminating the heterogeneity. The layers may also be produced by different resins, which the effect of providing an advantage in the manufacturing process, as a broader range of resins is at the manufacturers' disposal, while the transcription rate is maintained.

Additionally, an UV-blocking layer may be formed on the pattern layer in such a way that UV rays that can be generated depending on the type of light source are blocked, so that protection is provided for an optical film, an optical sheet and/or a Liquid Crystal Display (LCD) and/or other UV-ray sensitive substrates positioned next to the sheet.

In another aspect, in the manufacturing method of the present invention, an additional process step or a secondary working process is rendered obsolete, which makes it possible to manufacture superior optical sheets only through one co-extrusion process without rising extra costs. Therefore, a very useful invention is provided which does not only increase the mass-productivity of the sheets but also makes it possible to produce at low cost, thus contributing to industrial development.

An exemplary embodiment of the present invention can be described in detail based on the accompanying drawings:

FIG. 1 is a schematic illustration of an optical sheet according to the present invention in use, showing that the said optical sheet (1) arranged in front of a light source (2) diffuses light.

FIG. 2 is a partially enlarged cross-sectional view of an optical sheet (1) according to an embodiment of the present invention, wherein the optical sheet (1) comprises a pattern layer (10) and a core layer (11) and the diffusion or light guiding pattern (12) is formed on the surface of the said pattern layer (10).

FIG. 3 is a partially enlarged cross-sectional view of an optical sheet (1) according to another embodiment of the present invention, wherein the optical sheet (1) comprises a pattern layer (10) and a core layer (11), and wherein the diffusion or light guiding pattern (12) is formed on the surface of the said pattern layer (10), and wherein the surface of the rear side, being opposite to said pattern layer (10), of said core layer (11) is formed to have an emboss pattern (14).

FIG. 4 is a partially enlarged cross section view of an optical sheet (1) according to yet another embodiment of the present invention, wherein the optical sheet (1) comprises a pattern layer (10) and a core layer (11), wherein the diffusion or light guiding pattern (12) is formed on the surface of the said pattern layer (10), and wherein a UV blocking layer (13) is formed on the rear side of the said core layer (11).

FIG. 5 is a schematic illustration of the manufacturing process of an optical sheet according to the present invention. It is schematically showing a co-extrusion process to manufacture an optical sheet.

FIG. 6 is a partially enlarged view of a calender roll (40) according to the present invention, showing wherein a pressing part (41) is formed around the calender roll in such a way that the diffusion or light guiding pattern can be formed by pressing an optical sheet.

FIG. 7 is a side view of the sequence diagram illustrating an optical sheet manufacturing process according to the present invention, showing a side view of the specific co-extrusion process in regular sequence.

FIG. 8 is a plane figure of the sequence diagram illustrating an optical sheet manufacturing process according to the present invention, showing a plane view of the specific co-extrusion process to manufacture an optical sheet in regular sequence.

FIG. 9 shows two partially enlarged cross-sectional views of optical sheets (1) according to embodiments of the present invention, showing the dimensions pitch (p) and height (h) of two different diffusion or light guiding patterns and thickness (d) of the optical sheets (1).

Although the present invention allows the diffusion or light guiding pattern (12) for diffusing light to be formed on the surface of the optical sheet (1), it enhances the transcription rate of such a diffusion or light guiding pattern and forms the said diffusion or light guiding pattern (12) at low cost so that it can manufacture an optical sheet (1) with both high productivity and high mass-productivity. Because the optical sheet (1) according to the present invention is used for back light units for LCD's, lighting devices for billboards and the like, it is formed of a light-permeable resin through which light irradiated from a light source (2) can pass, as shown in FIG. 1.

Typical examples of such light-permeable resins include acrylic resin, polycarbonate resin, polyvinyl chloride resin, styrene resin, olefin resin, cycloolefin resin, acryl-styrene copolymer resin and polyester resin. Polycarbonate resin as used herein comprises homopolycarbonates, copolycarbonates and thermoplastic polyestercarbonates and blends thereof. The optical sheet formed of these kinds of light-permeable thermoplastic resins comprises a pattern layer (10) and a core layer (11), as shown in FIG. 2. The resins are chosen in such a way that the core layer (11) has a higher viscosity than the said pattern layer (10), because the diffusion or light guiding pattern to diffuse light is formed on the surface of the said pattern layer through an extrusion process, thus the core layer (11) should have a higher viscosity than the pattern layer (10) in order to enhance the transcription rate of the said diffusion or light guiding pattern (12).

For the resins of the core layer, the viscosities of the resins are typically in the range of 1-10 g/10 min for acrylic resin and polystyrene resin, and 3-20 g/10 min for polycarbonate resin and is particularly preferably from 5-14 g/10 min (measured at T=300° C./load 1.2 kg and determined according to standard method ISO 1133). For the resins of the pattern layers according to the invention, the viscosities of the resins need to be lower than that of the core layer. Here, on the basis of the melt flow index (MFR) determined according to standards ASTM D 1238 or the technically equivalent ISO 1133, the resins of the pattern layer have preferably a viscosity in the range of 10-200 g/10 min (at T=300° C., load 1.2 kg and determined according to standard method ISO 1133), and particularly preferably from 20-80 g/10 min (at T=300° C., load 1.2 kg and determined according to standard method ISO 1133).

An optical sheet according to the present invention is formed by light-permeable thermoplastic resins, but it should comprise a pattern layer (10) and a core layer (11) with different viscosities, especially by making the core layer (11) have a higher viscosity than the said pattern layer (10). In the process of forming the diffusion or light guiding pattern (12), the pressure is efficiently transmitted on the surface of the said pattern layer (10) due to the core layer (11), thereby making it easy to form the said diffusion or light guiding pattern (12).

The diffusion or light guiding pattern (12) formed on said pattern layer (10) should have a uniform appearance in order to diffuse light evenly and also should be formed with micro-patterns in order to minimize the influence such as the interference of light. It is believed that the diffusion or light guiding pattern (12) according to the present invention is suitable when having a pitch of ca. 50-500 μm and a height of ca. 20-200 μm. Although the total thickness of an optical sheet (1), on which such a diffusion or light guiding pattern (12) is formed, varies by the purpose of use, a thickness of ca. 0.5-3 mm is usual, with a thickness of ca. 0.8-2 mm being especially preferred.

For the pattern layer, a thickness of ca. 50-300 μm is preferred, and a thickness of ca. 150-250 μm is especially preferred.

Since the diffusion or light guiding pattern (12) is formed on the pattern layer having low viscosity, the transcription rate of the diffusion or light guiding pattern (12) was found to depend on the thickness of the said pattern layer (10). The advantages of the invention best come into effect with a ratio of the height of the said diffusion or light guiding pattern (12) to the thickness of the pattern layer (10) which is formed on one side of an optical sheet (1) of about 3-0.6.

In one embodiment, the pattern layer and the core layer according to the present invention are formed of the same kind of resin, but the viscosity of the resin of said pattern layer (10) is lower than that of the core layer (11) through the difference in molecular weight, in molecular structure, through the difference of the polymerization process or different additives. The purpose of this is to induce an efficient transmission of pressure in the process of forming the diffusion or light guiding pattern (12), and at the same time eliminating the heterogeneity of the pattern layer (10) and the core layer (11).

In another example of embodiment, pattern layer (10) and core layer (11) are formed of different kinds of resins, e.g. the core layer is formed of styrene resin or acrylic resin which has a relatively narrow grade for a viscosity range and the said pattern layer (10) is realized by applying a polycarbonate resin which has a relatively wide grade for a viscosity range.

The use of different kind of resins offers the advantage that it is relatively easy to adjust the viscosities compared to forming the pattern layer (10) and the core layer (11) of the same kind of resin. In addition, the transcription rate shows a similar result to that of using the same kind of resin.

In one embodiment, the core layer according to the present invention has a gloss pattern applied to the rear side of the core layer being opposite to the diffusion or light guiding pattern layer.

In yet another embodiment the said core layer (11) has an emboss pattern (14) formed on the rear side of the core layer being opposite to the diffusion or light guiding pattern layer, as it is shown in FIG. 3. The said emboss pattern (14) is desirable as it enhances light diffusion and surface hardness.

An UV-blocking layer may be formed on the core layer (11), as shown in FIG. 4, in order to protect the optical sheet (1) itself or an optical film, a LCD and/or other UV-ray sensitive substrates positioned next to the said optical sheet (1), by blocking UV rays that can be generated depending on the kind of a light source (2).

The diffusion or light guiding pattern (12) may be selected from various micro-patterns, such as arrays of lenticular lens, Fresnel lens, prism, semi-circle lens, and semi-oval lens. The optical sheet according to the invention has such a high transcription rate of the diffusion or light guiding pattern (12), that the light diffusion properties of the sheet are comparable to those of an optical film.

In another aspect, the method of manufacturing an optical sheet according to the present invention comprises:

e) a co-extrusion process wherein the first raw materials are extruded by a main extruder, and the second raw materials having a lower viscosity than said first raw materials are extruded by a co-extruder; said co-extrusion process continuously transports, pressurizes and melts the first and second raw materials in the main extruder and the co-extruder, respectively, by the difference in the relative velocity between a rotating screw and a barrel;

f) a sheet forming process that forms the first and second raw materials, that are completely melted through the co-extrusion process, into an optical sheet comprising a pattern layer and a core layer through a T-die;

g) a calendering process that forms the diffusion or light guiding pattern, which diffuses lights, on the pattern layer by pressing said optical sheet using a calender roll, whose surface has a lower temperature than the glass transition of the first and second raw materials and where the pressing part is formed around the roll; and h) a cooling process wherein said optical sheet with the diffusion or light guiding pattern formed on the pattern layer is cooled evenly by use of a guide roll, whereas the smoothness is maintained.

In another aspect, the manufacturing method according to the present invention uses a co-extrusion molding method that continuously transports, pressurizes, and melts thermoplastic resins. Light-permeable resins, which can be extruded, may be used as said thermoplastic resins. Examples of these light-permeable thermoplastic resins include acrylic resin, polycarbonate resin, polyvinyl chloride resin, styrene resin, olefin resin, cycloolefin copolymer resin, acryl-styrene copolymer resin, polyester resin and the like, preferably polycarbonate, polystyrene or modified polystyrene, PMMA or PET, or blends thereof, and in particular polycarbonate.

As shown in FIG. 5 or FIG. 8, the first raw material is processed by the main extruder and the second raw material having a lower viscosity than the said first raw material is processed by co-extruder.

The materials are each fed into the main extruder and the co-extruder, usually using a hopper. In addition, in case that the said first and second raw materials contain moisture or foreign substances, pretreatment steps are added before feeding the materials into the extruders, e.g. a drying process as well known to those skilled in the art, which removes moisture or foreign substances contained in the first and the second raw materials by drying.

For the resins of the core layer, the viscosities of the resins are typically in the range of 1-10 g/10 min for acrylic resin and polystyrene resin, and 3-20 g/10 min for polycarbonate resin and is particularly preferably from 5-14 g/10 min (measured at T=300° C./load 1.2 kg and determined according to standard method ISO 1133). For the resins of the pattern layers according to the invention, the viscosities of the resins need to be lower than that of the core layer. Here, on the basis of the melt flow index (MFR) determined according to standards ASTM D 1238 or the technically equivalent ISO 1133, the resins of the pattern layer have preferably a viscosity in the range of 10-200 g/10 min (at T=300° C., load 1.2 kg and determined according to standard method ISO 1133), and particularly preferably from 20-80 g/10 min (at T=300° C., load 1.2 kg and determined according to standard method ISO 1133).

In other embodiments, the grades used as resin for the core layer are in the range of 5-12 g/10 min (at T=300° C., load 1.2 kg and determined according to standard method ISO 1133) for polycarbonate resin and 1-8 g/10 min for acrylic resin and polystyrene resin.

The extrusion process according to the present invention continuously transports, pressurizes and melts the first and second raw materials fed into the main extruder and the co-extruder through a hopper, by the difference in the relative velocity between the rotating screw and the barrel.

Thus, the said first and second raw materials become completely melted by continuously passing through the main extruder and the co-extruder, the (co)extrusion process comprising transport and melting through barrels (not illustrated) and a rotating screw (not illustrated) installed inside the (co) extruder, and then these completely melted first and second materials are supplied to a T-die.

The said T-die (30) is connected and installed to the end part of the main extruder (20), and the co-extruder and the second co-extruder, if applicable, that will be described below are connected and installed to the T-die. The sheet forming process according to the present invention forms the completely melted first and second raw materials supplied to the said T-die (30) into an optical sheet (1) that comprises a pattern layer (10) and a core layer (11) and optionally a further functional layer (13). In other words, the first raw material supplied to the said T-die (30) is formed into a high-viscosity core layer as passing through the T-die (30), while the second raw material supplied into the T-die (30) is formed into a low-viscosity pattern layer as passing through the T-die (30), ultimately constituting an optical sheet (1) by the combination of the said core layer (11) and the pattern layer (10).

Alternatively, the extruder and the co-extruder may be connected to a coex-adapter (not illustrated). In the coex-adapter, the melt strands coming from extruder and coextruder(s) are layered. The layered melt strands are then pressed through a slit die forming the sheet comprising the layers as described above. The variants of the coextrusion process are known to the person skilled in the art, details are e.g. disclosed in EP-A 0 110 221, EP-A 0 110 238 and EP-A 0 716 919; in Johannaber/Ast: "Kunststoff-Maschinenführer", Hanser Verlag Germany, 2000; and in 'Gesellschaft Kunststofftechnik': "Coextrudierte Folien und Platten: Zukunftsperspektiven, Anforderungen, Anlagen und Qualitätssicherung", VDI-Verlag Germany, 1990).

Although the thickness of the said optical sheet (1) varies with the purpose of application, it is usually about 0.5-3 mm, with the thickness of 0.8-2 mm being desirable. The said optical sheet (1) comprises a pattern layer (10) and a core layer (11). Especially, the core layer (11) has a higher viscosity than the pattern layer (10) because the diffusion or light guiding pattern (12) to diffuse light is formed on the surface of the said pattern layer (10). In other words, the said optical sheet (1) comprises a pattern layer (10) and a core layer (11) with the core layer (11) having a higher viscosity than the above pattern layer (10), thereby making it easy for the diffusion or light guiding pattern to be shaped into the inner part of the said pattern layer (10) as the said core layer (11) pushes the pattern layer (10) with constant pressure, and increasing the transcription rate of the said diffusion or light guiding pattern (12) by preventing the diffusion or light guiding pattern (12) to be restored by elasticity prior to cooling.

In another aspect, an extension layer having a separate function like a UV-blocking layer (13) is formed on the rear side being opposite to the diffusion or light guiding pattern layer of said core layer (11), as shown in FIG. 4. The UV-blocking layer (13), an embodiment of the said extension layer, protects the said optical sheet (1) itself or an optical film and a LCD next to the said optical sheet (1) on the opposite side of the light source by blocking UV rays that can be generated according to the type of light source.

For this purpose, the present invention includes a process of additionally coextruding a functional material using a second co-extruder (23), as shown in FIG. 5. Light-permeable thermoplastic resins as described above, which can be extruded, further comprising any functional additives, e.g. UV light screeners, antistatic agents and/or diffusing agents and/or the like, are used as functional materials. Thus, the said functional materials are fed into the second co-extruder (23), and then supplied to the T-die (30) after continuous transport, pressurization, and melting. Thereby, an extension layer, such as an UV-blocking layer, is formed on the core layer (11).

A calendering process according to the present invention forms the diffusion or light guiding pattern which diffuses light, on the pattern layer (10) by passing the said optical sheet through a calender roll, whose surface has a lower temperature than the glass transition of the first and second raw materials and where the pressing part is formed around the roll as shown in FIG. 6.

The diffusion or light guiding pattern (12) is formed through the said pressing part (41). The patterns include lenticular lens patterns, Fresnel lens patterns, prism patterns, semicircle lens patterns, semi-oval lens patterns, and the like, through which light irradiated form a light source (2) is diffused.

The transcription rate can be determined by measuring the heights of the transcribed pattern in the sheet either with an optical microscope, with an electron microscope or with a microfigure measuring instrument.

These are divided by the size values of the original pattern in the roll, the resulting ratio is the transcription rate. The closer the rate is to 100%, the better is the transcription.

The needed transcription rates depend on the particular application. In general, for most purposes, a transcription rate above 90% is required.

The reason that the surface temperature of a calender roll (40), around which such a pressing part is formed, is lower than the glass transition temperature of the raw materials, is to solidify said optical sheet (1) which is not completely hardened in the calendering process. As a result, the optical sheet (1) having passed through the said calender roll (40) is formed in a board shape, close to a finished product. Also, the pressing part (41) is formed around the said calender roll (40) in order to form the diffusion or light guiding pattern (12) on the pattern layer (10) while calendering the optical sheet (1). The diffusion or light guiding pattern (12) which is formed by pressing the sheet with the pressing part (41), has e.g. a pitch of 50-500 μm and a height of 20-200 μm based on general lenticular lens patterns.

Although the said core layer (11) is usually formed to have the flat gloss pattern on the rear side, it may be also formed to have an emboss-like pattern as shown in FIG. 3. Light diffusion and surface hardness can be enhanced through the said emboss pattern (14). For this purpose, a supplementary calender roll (42) is installed next to the calender roll (40) as shown in FIG. 5 or in FIG. 7, which has an emboss pattern surface formed around the supplementary calender roll (42). Hence the rear part of the core layer (11) is formed to have the emboss pattern (14) in the process an optical sheet (1) passes through the said calender system due to pressing with the said supplementary calender roll (42).

A cooling process according to the present invention evenly cools the optical sheet (1) with a pattern layer (10), on which the diffusion or light guiding pattern (12) is formed, by transferring using a guide roll (50), thereby maintaining the smoothness. In other words, an optical sheet (1), on which the diffusion or light guiding pattern (12) is formed through the said calender roll (40), is cooled evenly through the contact with air in the process of transferring through a guide roll (50) to maintain smoothness. A separate cooling device may be used for rapid cooling, if necessary.

The process of manufacturing an optical sheet through the manufacturing method according to the present invention can be explained in order as followings: Light-permeable thermoplastic resins of different viscosities are used as first raw material which is fed into the main extruder and as second raw material, being fed into the co-extruder. The main extruder (20) and the co-extruder (22), into which the said the first and second raw materials are fed, transport, pressurize and melt the materials continuously, using the difference in the relative velocity between a barrel and a rotating screw. The completely melted first and second raw materials are formed into a pattern layer (10) and a core layer (11), respectively, while passing through a T-die (30), constituting an optical sheet (1) ultimately after combination. While passing through the calender, the optical sheet (1) is pressed by the pressing part (41) of a calender roll (40) forming a diffusion or light guiding pattern (12) into the pattern layer (10). The optical sheet (1) that has passed through the said calender is transferred to a guide roll (50), then is cooled evenly through the contact with air or a cooling device to maintain smoothness. The resulting sheet is made into a finished product after going through a cutting process and more later on.

Therefore, the pattern layer (10) with a thickness of 50~300 μm is formed on one side of an optical sheet (1), and the core layer (11) having a higher viscosity than the pattern layer (10) is formed on the other side, optionally an additional functional layer is supplied. The diffusion or light guiding pattern (12) is formed by pressing the pattern into the pattern layer through a calendering process. Thereby, an optical sheet (1) with a high transcription rate is provided.

EXAMPLES a) Equipment

Diffusion sheets comprising a core layer and a pattern layer were prepared using coextrusion equipment comprising an Extrusion Line manufactured by OMIPA (Italy). The main Extruder for the core layer had a diameter of 120 mm and a length of 3960 mm and the Co-extruder for the pattern layer had a diameter of 45 mm and a length of 1350 mm and the Co-extruder for the UV-layer had a diameter of 45 mm and a length of 1350 mm. A three-roll calendering system was used. The T-die had a width of 1300 mm.

For the precompounding of the materials for the pattern layer in Examples 6 and 7, a twin extruder having a diameter of 45 mm and a length of 1440 mm (L/D 32) was used.

b) Raw Material

Linear polycarbonate of optical quality (Makrolon® by Bayer MaterialScience AG) and a Trirex® polycarbonate grade by SamYang Corp., Korea were used as raw materials.

All melt flow rates (=melt index, melt flow index, MFR) were measured at T=300° C./load=1.2 kg and determined according to ISO 1133:1997; all values reported in the following relate to that measurement conditions.

For the pattern layers were used:
Trirex® 3025PJ having a melt flow index of 8 g/10 min;
Makrolon® 2600 having a melt flow index of 12 g/10 min;
Makrolon® 2400 having a melt flow index of 20 g/10 min;
Makrolon® 2200 having a melt flow index of 40 g/10 min;
Makrolon® OD 2015 MAS 164 having a melt flow index of 60 g/10 min;
Hywax® EP-184 by HanYang Synthesis, Korea, a mixture of C16-C18 fatty acid esters of pentaerythritol
For the core layer were used:
Makrolon® 3100 having a melt flow index of 6 g/10 min;
Makrolon® 2600 having a melt flow index of 12 g/10 min.
For the UV layer (functional layer) was used:
Makrolon® DP 1 1877 having a melt flow index of 63 g/10 min.

c) Process Conditions

The pre-dried materials were fed into the extruders using hoppers. The barrel temperatures of the main extruder were between 230° and 280° C. and the resulting melt temperature between 250-280° C. The rotation speed of main screw was 50-100 RPM (revolutions per minute). The line speed was 3-8 m/min. The barrel temperatures of the co-extruders were between 210° C. and 250° C. and the resulting melt temperatures were between 230-250° C. The rotation speed of the co-extruder screw was 50-100 RPM.

Die temperatures were between 250° C. and 295° C.
Temperatures of the calender rolls were between 160° C. and 105° C.

The surface of the $r^{nd}$ calender roll was furnished with a lenticular lens press pattern.

The resulting sheets were cooled to room temperatures using guide roll and conveyer. For the analysis, boards having a length of 1,500 mm and width of 1,200 mm were cut.

d) Examples 1-7

Sheets with pattern layers of resins of varying viscosities were produced. The original pattern in the calender roll was a lenticular lens pattern having a pitch of 90 μm and a height of 45 μm.

The following linear polycarbonates of optical quality (Makrolon® by Bayer MaterialScience AG) were used as raw materials for the layers:
Makrolon® 3100 having a melt flow index of 6 g/10 min was used for the core layer.

Trirex® 3025PJ having a melt flow index of 8 g/10 min (Example 1), Makrolon® 2600 having a melt flow index of 12 g/10 min (Example 2), Makrolon® 2400 having a melt flow index of 20 g/10 min (Example 3), Makrolon® 2200 having a melt flow index of 40 g/10 min (Example 4) and Makrolon® OD 2015 MAS 164 having a melt flow index of 60 g/10 min (Example 5) were used for the pattern layer.

A polycarbonate having a melt flow index of 70 g/10 min (Example 6) was obtained by precompounding 5% release agent (Hywax® EP-184 by HanYang Synthesis, Korea, a mixture of C16-C18 fatty acid esters of pentaerythritol) in Makrolon® OD2015 and a polycarbonate having a melt flow index of 100 g/10 min was obtained by precompounding 10% of the same release agent in Makrolon® OD2015. The mixing was done by precompounding on a 45-mm twin extruder at temperatures from 50-260° C.

Makrolon® DP 1 1877 having a melt volume rate of 63 g/10 min was used for the UV layer.

The core layer of the sheet had a thickness of 0.74 mm.
The pattern layer of the sheet had a thickness of 0.06 mm. The thickness of pattern layer was controlled by the screw speed (measured in RPM=revolutions per minute) of the co-extruder.

The pitches and heights (ref. FIG. 9) of the diffusion or light guiding patterns in the various sheets were determined by measurement with an optical microscope. The transcription ratio was calculated by dividing the measured heights in the pattern layers by the original height of the pattern in the roll.

Table 1 shows the results of analyzing the dependence of the transcription rate on the viscosity.

TABLE 1

| Example | Melt index of core layer g/(10 min) | Melt index of pattern layer g/(10 min) | Height of diffusion or light guiding pattern | Transcription rate |
| --- | --- | --- | --- | --- |
| 1 | 6 | 8 | 30 μm | 66.67% |
| 2 | 6 | 12 | 32 μm | 71.11% |
| 3 | 6 | 20 | 34 μm | 75.56% |
| 4 | 6 | 40 | 36 μm | 80.00% |
| 5 | 6 | 60 | 39 μm | 86.67% |
| 6 | 6 | 70 | 40 μm | 88.89% |
| 7 | 6 | 100 | 45 μm | 100% |

Table 1 shows that the larger the difference of viscosities of the said core layer (11) and said pattern layer (10), the more efficient the transmission of pressure, leading to a higher transcription rate of the diffusion or light guiding pattern (12). For reference, it is to be noted that a higher melt flow rate corresponds to a lower viscosity of resin.

With the core layer having a melt flow index of 6 g/10 min, a perfect transcription is accomplished with a resin for the pattern layer (10) having a melt flow index of 100 g/10 min. However, for most purposes and applications, a resin for the pattern layer (10) having a melt flow index of 70 g/10 min may be sufficient.

e) Examples 8-14

Sheets were produced using the equipment described above.
Makrolon® OD2015 having a melt flow index of 60 g/10 min was used for the pattern layer.
Makrolon® 2600 having a melt flow index of 12 g/10 min was used for the core layer.
The sheets had a thickness (d) of 1.5-1.2 mm.

The thickness of the pattern layers of the sheets were adjusted to various sizes from 0-300 μm (see Table 2). The thickness of the pattern layer was controlled by the screw speed (RPM) of the co-extruder.

The original pressing pattern in the roll had a pitch of 300 μm and a height of 150 μm.

The heights of the patterns in each sheet and the transcription rates were determined as described above for Examples 1-7- for pitch and height, refer to FIG. 9).

Table 2 shows the analysis result of the transcription rate of the said diffusion or light guiding pattern (12) depending on the thickness of the pattern layer (10). The results show that the transcription rate approaches an optimum value when the thickness of the pattern layer comes close to the original height of pattern.

TABLE 2

| Example | Thickness of pattern layer | Screw speed of Coextruder (RPM) | Height of diffusion or light guiding pattern | Transcription rate |
|---|---|---|---|---|
| 8 | 0 μm | 0 | 127 μm | 84.67% |
| 9 | 50 μm | 13 | 135 μm | 90.00% |
| 10 | 100 μm | 32 | 140 μm | 93.33% |
| 11 | 150 μm | 46 | 148 μm | 98.67% |
| 12 | 200 μm | 64 | 148 μm | 98.67% |
| 13 | 250 μm | 80 | 146 μm | 97.33% |
| 14 | 300 μm | 92 | 145 μm | 96.67% |

Since the diffusion or light guiding pattern (12) is formed on the pattern layer with a low viscosity, the transcription rate of the diffusion or light guiding pattern (12) varies by the thickness of the said pattern layer (10), which is shown in Table 2.

As shown in the above Table 2, when the diffusion or light guiding pattern is formed with a height of 150 μm, a thickness of ca. 50-300 μm is desirable for the thickness of the pattern layer (10), showing the most perfect recall rate at a thickness of ~150-250 μm.

Nomenclature on Drawings

Figure 1:
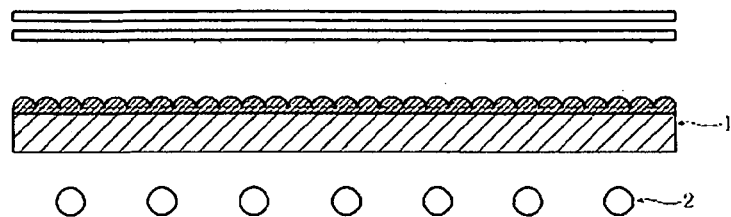
FIG. 1 is a schematic illustration of an optical sheet in use according to the present invention.
Figure 2:
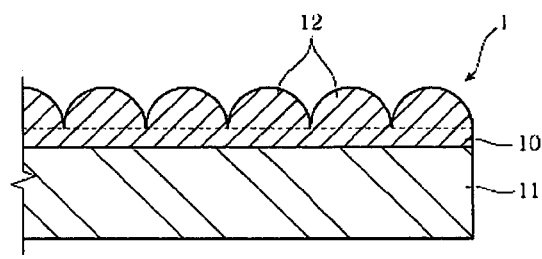
FIG. 2 is a partially enlarged cross-sectional view of an optical sheet according to an embodiment of the present invention.
Figure 3:
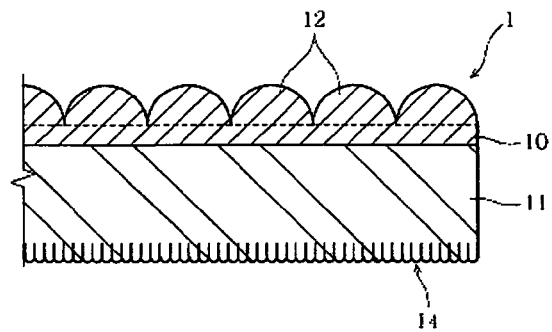
FIG. 3 is a partially enlarged cross-sectional view of an optical sheet according to an alternative embodiment of the present invention.
Figure 4:
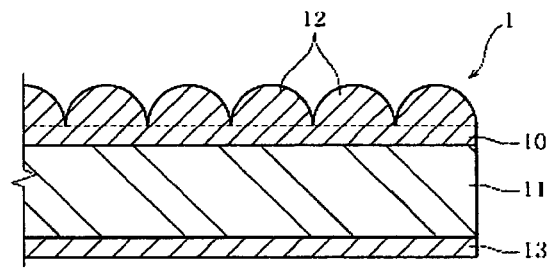
FIG. 4 is a partially enlarged cross section view of an optical sheet according to another embodiment of the present invention.
Figure 5:
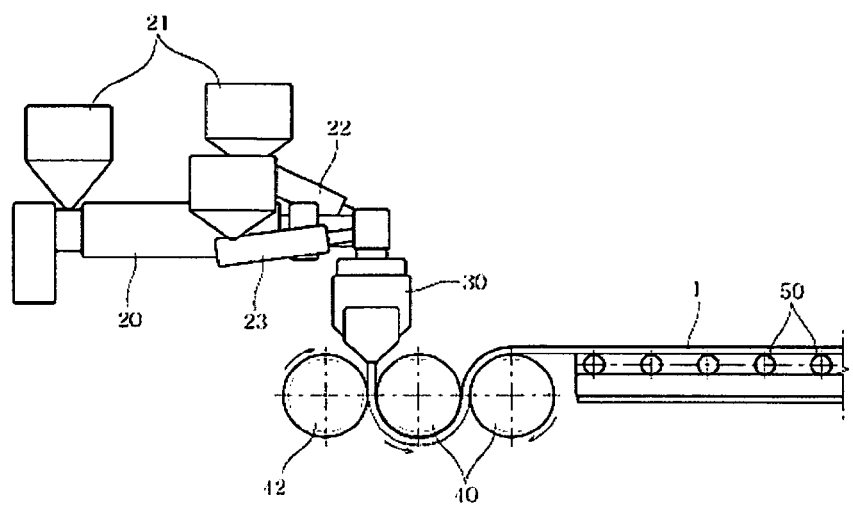
FIG. 5 is a schematic illustration of the manufacturing process of an optical sheet according to the present invention.
Figure 6:
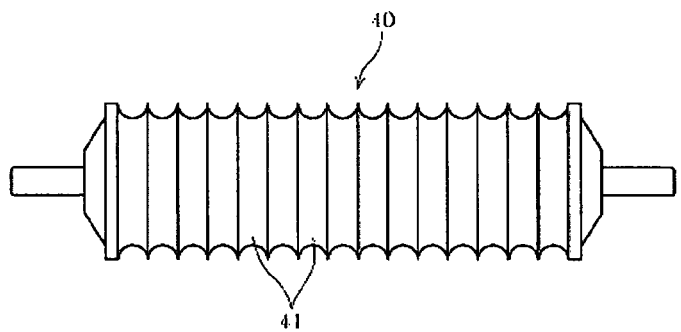
FIG. 6 is a partially enlarged view of a calender roll according to the present invention.
Figure 7:
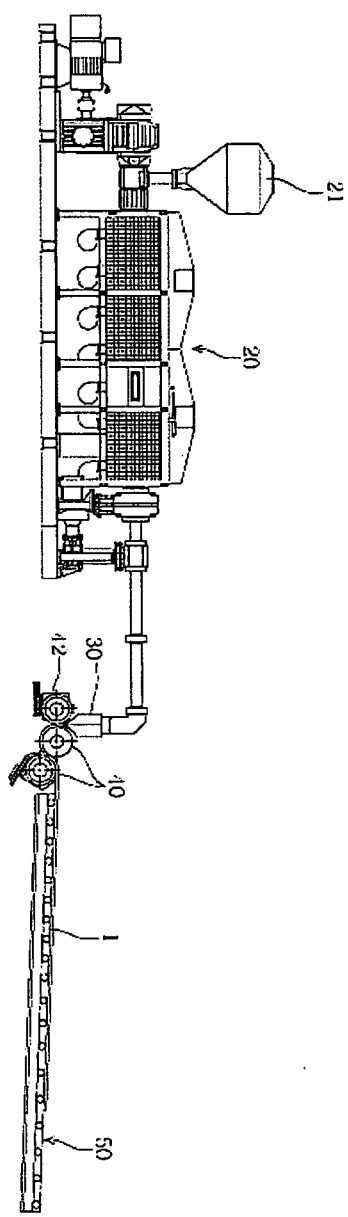
FIG. 7 is a side view of the sequence diagram illustrating an optical sheet manufacturing process according to the present invention.
Figure 8:
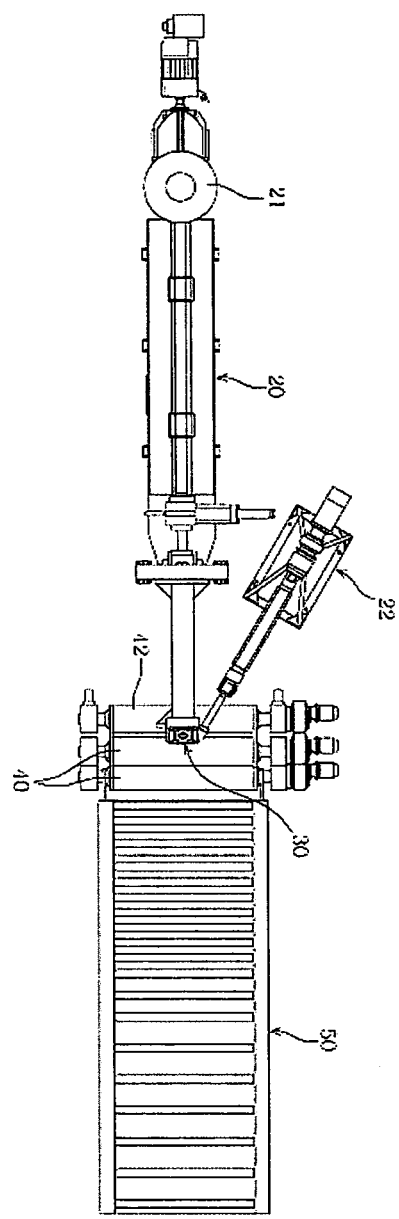
FIG. 8 is a plane view of the sequence diagram illustrating an optical sheet manufacturing process according to the present invention.
Figure 9:
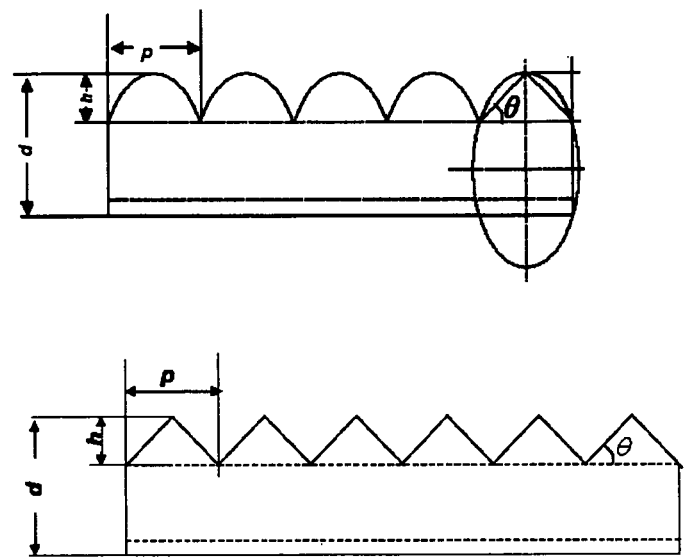
FIG. 9 comprises two partially enlarged cross section views of optical sheets according to various embodiments of the present invention illustrating pitch (p) and height (h) of the diffusion or light guiding pattern and total thickness (d) of the sheet.

| 10 | Pattern layer | 11 | Core layer |
|---|---|---|---|
| 12 | Diffusion or light guiding pattern | 13 | UV-blocking layer |
| 14 | Emboss pattern | 20 | Main extruder |
| 22 | Co-extruder | 30 | T-die |
| 40 | Calender roll | 41 | Pressurizing part. |
| 50 | Guide roll | | |

The invention claimed is:

1. An optical sheet, comprising:
    at least a pattern layer and a core layer, composed of light-permeable thermoplastic resins for light to pass through, wherein a diffusion or light guiding pattern is formed on the pattern layer and the core layer being on the opposite side of the diffusion or light guiding pattern has a higher viscosity than said pattern layer, wherein said pattern layer and said core layer are composed of polycarbonates, wherein the polycarbonate of the core layer has a viscosity of 3-20 g/10 min and the polycarbonate of the pattern layer has a viscosity of 10-200 g/10 min, and wherein the viscosities are measured at T=300° C./load 1.2 kg and determined according to standard method ISO 1133:1997.

2. The optical sheet according to claim 1, wherein said pattern layer and said core layer are composed of the same kind of light-permeable thermoplastic resins.

3. The optical sheet according to claim 1, wherein said pattern layer and said core layer are composed of different kinds of light-permeable thermoplastic resins.

4. The optical sheet according to claim 1, wherein an emboss pattern is formed on the rear side, opposite of the pattern layer, of said core layer.

5. The optical sheet according to claim 1, wherein a functional layer is formed the rear side, opposite of the pattern layer, of said core layer.

6. The optical sheet according to claim 5, wherein said functional layer is a UV-blocking layer.

7. A manufacturing method for an optical sheet according to claim 1 comprising:
    a. a co-extrusion process wherein the first raw materials are extruded by a main extruder, and the second raw materials having a lower viscosity than said first raw materials are extruded by a co-extruder;
    b a sheet forming process that forms the first and second raw materials, that are completely melted through said co-extrusion process, into a sheet comprising a pattern layer and a core layer through a T-die;
    c. a calendering process that forms the diffusion or light guiding pattern, which diffuses lights, on the pattern layer by pressing said sheet by using a calender roll, whose surface has a lower temperature than the glass transition of the first and second raw materials and with a pressing part that is formed around the roll; and
    d. a cooling process wherein the optical sheet with the diffusion or light guiding pattern formed on the pattern layer is cooled evenly by use of a guide roll.

8. The optical sheet manufacturing method defined in claim 7 additionally comprising the coextrusion of a functional material layer by a second co-extruder.

9. The optical sheet manufacturing method defined in claim 7, additionally comprising the formation an emboss pattern on the rear side of said core layer by a supplementary calender roll, around which an emboss pattern is formed, in the process step of calendering c).

10. The optical sheet according to claim 1, wherein the polycarbonate of the core layer has a viscosity of 5-14 g/10 min.

11. The optical sheet according to claim 1, wherein the polycarbonate of the pattern layer has a viscosity of 20-80 g/10 min.

12. An optical sheet, comprising:
at least a pattern layer and a core layer, composed of light-permeable thermoplastic resins for light to pass through, wherein a diffusion or light guiding pattern is formed on the pattern layer and the core layer being on the opposite side of the diffusion or light guiding pattern has a higher viscosity than said pattern layer, wherein said pattern layer and said core layer are composed of polycarbonates, wherein the polycarbonate of the core layer has a viscosity of 5-14 g/10 min and the polycarbonate of the pattern layer has a viscosity of 20-80 g/10 min, and wherein the viscosities are measured at T=300° C. / load 1.2 kg and determined according to standard method ISO 1133:1997.

* * * * *